United States Patent
Ryu et al.

(10) Patent No.: US 8,225,294 B2
(45) Date of Patent: Jul. 17, 2012

(54) METHOD AND APPARATUS FOR EXPRESSING AND CHECKING RELATIONSHIPS BETWEEN TYPES

(75) Inventors: Sukyoung Ryu, Cambridge, MA (US); Eric E. Allen, Cedar Park, TX (US); Victor M. Luchangco, Cambridge, MA (US); Joseph J. Hallett, III, Boston, MA (US); Samuel Y. Tobin-Hochstadt, Cambridge, MA (US)

(73) Assignee: Oracle America, Inc., Redwood Shores, CA (US)

( * ) Notice: Subject to any disclaimer, the term of this patent is extended or adjusted under 35 U.S.C. 154(b) by 1103 days.

(21) Appl. No.: 11/412,662

(22) Filed: Apr. 27, 2006

(65) Prior Publication Data

US 2007/0256060 A1    Nov. 1, 2007

(51) Int. Cl.
*G06F 9/44* (2006.01)

(52) U.S. Cl. ......... 717/140; 717/108; 717/116; 717/148

(58) Field of Classification Search .................. None
See application file for complete search history.

(56) References Cited

U.S. PATENT DOCUMENTS

| | | | | |
|---|---|---|---|---|
| 5,293,629 A | * | 3/1994 | Conley et al. | 717/154 |
| 5,579,518 A | * | 11/1996 | Yasumatsu | 717/131 |
| 5,696,973 A | * | 12/1997 | Agrawal et al. | 717/154 |
| 5,748,966 A | * | 5/1998 | Sato | 717/131 |
| 5,991,538 A | * | 11/1999 | Becker | 717/140 |
| 6,083,276 A | * | 7/2000 | Davidson et al. | 717/107 |
| 7,577,682 B2 | * | 8/2009 | Mueller et al. | 707/104.1 |
| 2003/0154468 A1 | * | 8/2003 | Gordon et al. | 717/143 |
| 2004/0194117 A1 | * | 9/2004 | Schulte et al. | 719/328 |
| 2006/0080644 A1 | * | 4/2006 | Fuhrer et al. | 717/137 |
| 2006/0212847 A1 | * | 9/2006 | Tarditi et al. | 717/117 |
| 2006/0236315 A1 | * | 10/2006 | Bracha | 717/168 |
| 2006/0242628 A1 | * | 10/2006 | Plesko et al. | 717/131 |
| 2007/0006191 A1 | * | 1/2007 | Franz et al. | 717/146 |
| 2007/0028210 A1 | * | 2/2007 | Meijer et al. | 717/114 |
| 2007/0234288 A1 | * | 10/2007 | Lindsey et al. | 717/117 |
| 2008/0313609 A1 | * | 12/2008 | Meijer et al. | 717/114 |

OTHER PUBLICATIONS

Eric Allen, "The Fortress Language Specification", Apr. 26, 2005, Version 0.618, pp. 1-111.*

* cited by examiner

*Primary Examiner* — Isaac Tecklu
(74) *Attorney, Agent, or Firm* — Park, Vaughan, Fleming & Dowler LLP

(57) ABSTRACT

One embodiment of the present invention provides a system for generating executable code. During operation, the system receives source code, wherein the source code can include declarations for types and operations, wherein the type declarations may be parameterized, and wherein the source code may specify subtyping relationships between declared types. Next, the system compiles or interprets the source code to produce executable code, wherein the type parameters may be instantiated by different types during execution, and wherein the result of executing operations may depend upon the instantiations of the type parameters. While compiling or interpreting the source code, the system checks the types and operations in the source code to ensure that the executable code generated is type-safe, and hence will not generate type errors during execution.

23 Claims, 10 Drawing Sheets

| | | | |
|---|---|---|---|
| $p$ | ::= | $\vec{d}\ e$ | program |
| $d$ | ::= | $td$ | |
| | \| | $od$ | |
| $td$ | ::= | trait $T[\overrightarrow{\alpha\ \text{extends}\ \{\vec{K}\}}]$ extends $\{\vec{N}\}$ where $\{\overrightarrow{\alpha\ \text{extends}\ \{\vec{K}\}}\}\ \overrightarrow{fd}$ end | trait definition |
| $od$ | ::= | object $O[\overrightarrow{\alpha\ \text{extends}\ \{\vec{K}\}}](\overrightarrow{x:\tau})$ extends $\{\vec{N}\}$ where $\{\overrightarrow{\alpha\ \text{extends}\ \{\vec{K}\}}\}\ \overrightarrow{fd}$ end | object definition |
| $fd$ | ::= | $f[\overrightarrow{\alpha\ \text{extends}\ \{\vec{K}\}}](\overrightarrow{x:\tau}):\tau = e$ | method definition |
| $e$ | ::= | $x$ | variable reference |
| | \| | self | self reference |
| | \| | $O[\vec{\tau}](\vec{e})$ | object creation |
| | \| | $e.x$ | field access |
| | \| | $e$ in $C[\vec{\tau}].f[\vec{\tau}](\overrightarrow{e\ \text{in}\ \tau})$ in $\tau$ | method invocation |
| | \| | typecase $x = e$ in $\overrightarrow{\tau \Rightarrow e}$ else $e$ end | type-dependent operation |
| $\tau,\tau',\tau''$ | ::= | $O[\vec{\tau}]$ | object type |
| | \| | $K$ | bound on type variable |
| $K,H$ | ::= | $\alpha$ | type variable |
| | \| | $N$ | super trait |
| $N$ | ::= | $T[\vec{\tau}]$ | trait type |
| | \| | Object | Object type |

FIG. 1

Program typing: $\boxed{\vdash p : \tau}$

[T-PROGRAM] $\dfrac{p = \vec{d}\ e \quad p \vdash \vec{d}\ \text{ok} \quad p;\emptyset;\emptyset \vdash e : \tau}{\vdash p : \tau}$ Definition typing: $\boxed{p \vdash d\ \text{ok}}$

[T-TRAITDEF] $\dfrac{p \vdash validMultipleInheritance(T) \quad \Delta = \overrightarrow{\alpha <: \{\vec{K}\}}\ \overrightarrow{\beta <: \{\vec{H}\}} \quad p;\Delta \vdash \vec{K}\ \text{ok} \quad p;\Delta \vdash \vec{N}\ \text{ok} \quad p;\Delta \vdash \vec{H}\ \text{ok} \quad p;\Delta; \text{self} : T[\vec{\alpha}]; \Gamma \vdash \vec{fd}\ \text{ok}}{p \vdash \text{trait } T[\overrightarrow{\alpha\ \text{extends}\ \{\vec{K}\}}] \text{ extends } \{\vec{N}\} \text{ where } \{\overrightarrow{\beta\ \text{extends}\ \{\vec{H}\}}\}\ \vec{fd}\ \text{end ok}}$

[T-OBJECTDEF] $\dfrac{p \vdash validMultipleInheritance(O) \quad \Delta = \overrightarrow{\alpha <: \{\vec{K}\}} \quad \Delta' = \Delta\ \overrightarrow{\beta <: \{\vec{H}\}} \quad p;\Delta' \vdash \vec{K}\ \text{ok} \quad p;\Delta \vdash \vec{\tau}\ \text{ok} \quad p;\Delta' \vdash \vec{N}\ \text{ok} \quad p;\Delta' \vdash \vec{H}\ \text{ok} \quad p;\Delta'; \text{self} : O[\vec{\alpha}]\ \overrightarrow{x:\tau}; \Gamma \vdash \vec{fd}\ \text{ok}}{p \vdash \text{object } O[\overrightarrow{\alpha\ \text{extends}\ \{\vec{K}\}}](\overrightarrow{x:\tau}) \text{ extends } \{\vec{N}\} \text{ where } \{\overrightarrow{\beta\ \text{extends}\ \{\vec{H}\}}\}\ \vec{fd}\ \text{end ok}}$ Method typing: $\boxed{p; \Delta; \Gamma; C \vdash fd\ \text{ok}}$

[T-METHODDEF] $\dfrac{p \vdash override(f, C, [\overrightarrow{\alpha\ \text{extends}\ \{\vec{K}\}}]\ \vec{\tau} \to \tau_0) \quad \Delta' = \Delta\ \overrightarrow{\alpha <: \{\vec{K}\}} \quad p;\Delta' \vdash \vec{K}\ \text{ok} \quad p;\Delta' \vdash \vec{\tau}\ \text{ok} \quad p;\Delta' \vdash \tau_0\ \text{ok} \quad p;\Delta'; \Gamma\ \overrightarrow{x:\tau} \vdash e : \tau' \quad p;\Delta' \vdash \tau' <: \tau_0}{p;\Delta; \Gamma; C \vdash f[\overrightarrow{\alpha\ \text{extends}\ \{\vec{K}\}}](\overrightarrow{x:\tau}):\tau_0 = e\ \text{ok}}$ Expression typing: $\boxed{p; \Delta; \Gamma \vdash e : \tau}$

[T-VAR] $\quad p;\Delta;\Gamma \vdash x : \Gamma(x)$

[T-SELF] $\quad p;\Delta;\Gamma \vdash \text{self} : \Gamma(\text{self})$

[T-OBJECT] $\dfrac{\text{object } O[\overrightarrow{\alpha\ \text{extends}\ \_}](\overrightarrow{\_:\tau'})\_\ \text{end} \in p \quad p;\Delta \vdash O[\vec{\tau}]\ \text{ok} \quad p;\Delta;\Gamma \vdash \vec{e} : \vec{\tau''} \quad p;\Delta \vdash \vec{\tau''} <: [\vec{\tau}/\vec{\alpha}]\vec{\tau'}}{p;\Delta;\Gamma \vdash O[\vec{\tau}](\vec{e}) : O[\vec{\tau}]}$

[T-FIELD] $\dfrac{p;\Delta;\Gamma \vdash e_0 : \tau_0 \quad bound_\Delta(\tau_0) = \{O[\vec{\tau'}]\} \quad \text{object } O[\overrightarrow{\alpha\ \text{extends}\ \_}](\overrightarrow{x:\tau})\_\ \text{end} \in p}{p;\Delta;\Gamma \vdash e_0.x_i : [\vec{\tau'}/\vec{\alpha}]\tau_i}$

[T-METHOD] $\dfrac{\begin{array}{c} p;\Delta;\Gamma \vdash e_0 : \tau_0 \quad p;\Delta \vdash \tau_0 <: C[\vec{\tau^c}] \quad mtype_p(f, C[\vec{\tau^c}], \emptyset) = \{([\overrightarrow{\alpha'\ \text{extends}\ \{\vec{K'}\}}]\ \vec{\tau} \to \tau'_0, \Delta')\} \\ p;\Delta \vdash \vec{\tau}\ \text{ok} \quad p;\Delta \vdash C[\vec{\tau^c}]\ \text{ok} \quad p;\Delta \vdash \vec{\tau^d}\ \text{ok} \quad p;\Delta \vdash \vec{\tau^r}\ \text{ok} \quad p;\Delta;\Gamma \vdash \vec{e} : \vec{\tau''} \quad p;\Delta \vdash \vec{\tau''} <: \vec{\tau^d} \\ dom(\Delta') = \{\vec{\beta}\} \quad S = [\vec{\tau^\beta}/\vec{\beta}] \quad p \vdash validWitness(\Delta, \Delta', \vec{\tau^\beta}) \\ p;\Delta \vdash \vec{\tau} <: S([\vec{\tau}/\vec{\alpha'}]\vec{K'}) \quad S([\vec{\tau}/\vec{\alpha'}]\vec{\tau}) = \vec{\tau^d} \quad S([\vec{\tau}/\vec{\alpha'}]\tau'_0) = \tau^r \end{array}}{p;\Delta;\Gamma \vdash e_0\ \text{in}\ C[\vec{\tau^c}].f[\vec{\tau}](\overrightarrow{e\ \text{in}\ \tau^d})\ \text{in}\ \tau^r : \tau^r}$

[T-TYPECASE] $\dfrac{p;\Delta;\Gamma \vdash e : \tau \quad p;\Delta;\Gamma\ x:\tau_i \vdash e_i : \tau_i^e \quad p;\Delta \vdash \tau_i^e <: \tau' \quad 1 \leq i \leq |\vec{\tau}| \quad p;\Delta;\Gamma\ x:\tau \vdash e' : \tau^{e'} \quad p;\Delta \vdash \tau^{e'} <: \tau'}{p;\Delta;\Gamma \vdash \text{typecase}\ x = e\ \text{in}\ \overrightarrow{\tau \Rightarrow e}\ \text{else}\ e'\ \text{end} : \tau'}$

FIG. 2

Subtyping: $\boxed{p; \Delta \vdash \tau <: \tau}$

[S-OBJ] $\qquad p; \Delta \vdash \tau <:$ Object

[S-REFL] $\qquad p; \Delta \vdash \tau <: \tau$

[S-TRANS] $\qquad \dfrac{p; \Delta \vdash \tau_1 <: \tau_2 \quad p; \Delta \vdash \tau_2 <: \tau_3}{p; \Delta \vdash \tau_1 <: \tau_3}$

[S-VAR] $\qquad \dfrac{\tau \in \Delta(\alpha)}{p; \Delta \vdash \alpha <: \tau}$

[S-TAPP] $\qquad \dfrac{\_C[\overrightarrow{\alpha \text{ extends } \{\overrightarrow{K}\}}] \text{ extends } \{\overrightarrow{N}\} \text{ where } \{\overrightarrow{\beta \text{ extends } \{\overrightarrow{H}\}}\}\_ \in p \quad p; \Delta \vdash \overrightarrow{\tau} \text{ ok}}{p; \Delta \vdash \overrightarrow{\tau} <: [\overrightarrow{\tau^\beta/\beta}][\overrightarrow{\tau/\alpha}]\overrightarrow{K} \quad p \vdash validWitness(\Delta, \overrightarrow{\beta <: \{[\overrightarrow{\tau/\alpha}]\overrightarrow{H}\}}, \overrightarrow{\tau^\beta})}$
$\qquad \qquad \dfrac{}{p; \Delta \vdash C[\overrightarrow{\tau}] <: [\overrightarrow{\tau^\beta/\beta}][\overrightarrow{\tau/\alpha}]N_i}$ Well-formed types: $\boxed{p; \Delta \vdash \tau \text{ ok}}$

[W-OBJ] $\qquad p; \Delta \vdash$ Object ok

[W-VAR] $\qquad \dfrac{\alpha \in dom(\Delta)}{p; \Delta \vdash \alpha \text{ ok}}$

[W-TAPP] $\qquad \dfrac{\_C[\overrightarrow{\alpha \text{ extends } \{\overrightarrow{K}\}}]\_ \text{ where } \{\overrightarrow{\beta \text{ extends } \{\overrightarrow{H}\}}\}\_ \in p \quad p; \Delta \vdash \overrightarrow{\tau} \text{ ok}}{p; \Delta \vdash \overrightarrow{\tau} <: [\overrightarrow{\tau^\beta/\beta}][\overrightarrow{\tau/\alpha}]\overrightarrow{K} \quad p \vdash validWitness(\Delta, \overrightarrow{\beta <: \{[\overrightarrow{\tau/\alpha}]\overrightarrow{H}\}}, \overrightarrow{\tau^\beta})}$
$\qquad \qquad \dfrac{}{p; \Delta \vdash C[\overrightarrow{\tau}] \text{ ok}}$ Method type lookup: $\boxed{mtype_p(f, \tau, \Delta) = \{(\eta, \Delta)\}}$

[MT-SELF] $\qquad \dfrac{\_C[\overrightarrow{\alpha \text{ extends } \_}]\_ \text{ where } \{\overrightarrow{\beta \text{ extends } \{\overrightarrow{H}\}}\}\_\overrightarrow{fd}\_ \in p}{f[\overrightarrow{\alpha' \text{ extends } \{\overrightarrow{K'}\}}](\overrightarrow{\_:\tau'}):\tau_0\_ \in \{\overrightarrow{fd}\} \quad \Delta' = \Delta, \overrightarrow{\beta <: \{\overrightarrow{H}\}}}$
$\qquad \qquad \dfrac{}{mtype_p(f, C[\overrightarrow{\tau}], \Delta) = \{([\overrightarrow{\tau/\alpha}][\overrightarrow{\alpha' \text{ extends } \{\overrightarrow{K'}\}}]\overrightarrow{\tau'} \to \tau_0, [\overrightarrow{\tau/\alpha}]\Delta')\}}$

[MT-SUPER] $\qquad \dfrac{\_C[\overrightarrow{\alpha \text{ extends } \_}] \text{ extends } \{\overrightarrow{N}\} \text{ where } \{\overrightarrow{\beta \text{ extends } \{\overrightarrow{H}\}}\}\_\overrightarrow{fd}\_ \in p}{f \notin \{\overrightarrow{Fname(fd)}\} \quad \Delta' = \Delta, \overrightarrow{\beta <: \{\overrightarrow{H}\}}}$
$\qquad \qquad \dfrac{}{mtype_p(f, C[\overrightarrow{\tau}], \Delta) = \bigcup_{N_i \in \{\overrightarrow{N}\}} mtype_p(f, [\overrightarrow{\tau/\alpha}]N_i, [\overrightarrow{\tau/\alpha}]\Delta')}$

[MT-OBJ] $\qquad mtype_p(f, \text{Object}, \Delta) = \emptyset$

Valid witnesses: $\boxed{p \vdash validWitness(\Delta, \overrightarrow{\alpha <: \{\overrightarrow{\tau}\}}, \overrightarrow{\tau})}$

[VALIDWITNESS] $\qquad \dfrac{p; \Delta \vdash \overrightarrow{[\overrightarrow{\tau^\beta/\beta}]\overrightarrow{\tau}} \text{ ok} \quad p; \Delta \vdash \overrightarrow{\tau^\beta} \text{ ok} \quad p; \Delta \vdash \overrightarrow{\tau^\beta} <: \overrightarrow{[\overrightarrow{\tau^\beta/\beta}]\overrightarrow{\tau}} \quad \{\overrightarrow{\beta}\} \cap dom(\Delta) = \emptyset}{p \vdash validWitness(\Delta, \overrightarrow{\beta <: \{\overrightarrow{\tau}\}}, \overrightarrow{\tau^\beta})}$ Function/method name lookup: $\boxed{Fname(fd) = f}$ $Fname(f[\overrightarrow{\alpha \text{ extends } \{\overrightarrow{K}\}}](\overrightarrow{x:\tau}):\tau = e) = f$

FIG. 3

Bound of type: $\boxed{bound_\Delta(\tau) = \{\vec{\tau}\}}$ $bound_\Delta(\alpha) = \bigcup_{\tau_i \in \Delta(\alpha)} bound_\Delta(\tau_i)$
$bound_\Delta(N) = \{N\}$
$bound_\Delta(O[\vec{\tau}]) = \{O[\vec{\tau}]\}$ Traits defining a method: $\boxed{defining_p(f, N) = \{\vec{N}\}}$ $defining_p(f, \text{Object}) = \emptyset$ $defining_p(f, C[\vec{\tau}]) = \begin{cases} \bigcup_{N_i \in \{\vec{N}\}} defining_p(f, [\vec{\tau}/\vec{\alpha}]N_i) & \text{if } \_C[\![\vec{\alpha}\_]\!]\_ \text{ extends } \{\vec{N}\}\_ \in p \text{ and } f \notin defined_p(C) \\ \bigcup_{N_i \in \{\vec{N}\}} defining_p(f, [\vec{\tau}/\vec{\alpha}]N_i) \cup \{C[\vec{\tau}]\} & \text{if } \_C[\![\vec{\alpha}\_]\!]\_ \text{ extends } \{\vec{N}\}\_ \in p \text{ and } f \in defined_p(C) \end{cases}$ Auxiliary functions for methods: $\boxed{defined_p \ / \ inherited_p \ / \ visible_p(C) = \{\vec{f}\}}$ $defined_p(C) = \{\overline{Fname(fd)}\}$      where $\_C\_\vec{fd}\_ \in p$ $inherited_p(C) = \biguplus_{N_i \in \{\vec{N}\}} \{f_i \mid f_i \in visible_p(N_i), f_i \notin defined_p(C)\}$      where $\_C\_ \text{ extends } \{\vec{N}\}\_ \in p$ $visible_p(C) = defined_p(C) \uplus inherited_p(C)$

FIG. 4

Valid multiple inheritance: $\boxed{p \vdash validMultipleInheritance(C)}$

[VALIDMI] $\dfrac{p \vdash oneOwner(C) \qquad p \vdash validWhere(C)}{p \vdash validMultipleInheritance(C)}$ One owner for all the visible methods: $\boxed{p \vdash oneOwner(C)}$

[ONEOWNER] $\dfrac{\forall f \in visible_p(C) \,.\, f \text{ only occurs once in } visible\_p(C)}{p \vdash oneOwner(C)}$ Valid where clauses: $\boxed{p \vdash validWhere(C)}$

[VALIDWHERE] $\dfrac{\left\{ \forall f \in visible_p(C) \,.\, mbody_p(f[\overrightarrow{\alpha^j}], C[\overrightarrow{\alpha}], C[\overrightarrow{\alpha}]) = \{\_ \to e_f\} \quad \underline{\_C[\overrightarrow{\alpha^-}]\_ \text{ extends } \{\overrightarrow{N}\}\_ \in p} \quad mtype_p(f, C[\overrightarrow{\alpha}], \emptyset) = \{(\eta_f, \Delta)\} \right\}}{p \vdash validWhere(C)}$ implies $\left\{ \left( \begin{array}{c} \forall \beta \in (FTV(e_f) \setminus \{\overrightarrow{\alpha}\ \overrightarrow{\alpha^j}\}) \,.\, \beta \in FTV(\eta_f) \\ \forall \beta \in (FTV(\eta_f) \setminus \{\overrightarrow{\alpha}\ \overrightarrow{\alpha^j}\}) \,.\, \forall C'[\overrightarrow{r^e}] \in \bigcup_{N_i \in \{\overrightarrow{N}\}} defining_p(f, N_i) \,. \\ \beta = r_i^c \quad \Delta(\beta) = \overrightarrow{K_i'} \quad \text{for } 1 \leq i \leq |\overrightarrow{r^e}| \quad \text{where } \_C'[\alpha' \text{ extends } \{\overrightarrow{K'}\}]\_ \in p \end{array} \right) \right\}$

FIG. 5

Method overriding: $p \vdash \textit{override}(f, C, \eta)$

[OVERRIDE]
$$\frac{\begin{array}{c}\_\ C[\![\overrightarrow{\alpha'' \text{ extends } \{\overrightarrow{K''}\}}]\!]\ \_\ \overrightarrow{\text{extends } \{\overrightarrow{N}\}}\ \overrightarrow{\text{where } \{\beta \text{ extends } \{\overrightarrow{H}\}\}}\ \_\ \in p \\ \Delta = \overrightarrow{\alpha'' <: \{\overrightarrow{K''}\}}\ \overrightarrow{\beta <: \{\overrightarrow{H}\}} \\ \bigcup_{C'[\![\overrightarrow{\tau''}]\!] \in \{\overrightarrow{N}\}} \mathit{mtype}_p(f, C'[\![\overrightarrow{\tau''}]\!], \Delta) = \{([\![\overrightarrow{\alpha' \text{ extends } \{\overrightarrow{K'}\}}]\!]\ \overrightarrow{\tau'} \to \tau'_0, \Delta')\} \\ \overrightarrow{K} = [\overrightarrow{\alpha}/\overrightarrow{\alpha'}]\overrightarrow{K'} \qquad p; \Delta' \vdash [\overrightarrow{\alpha}/\overrightarrow{\alpha'}]\overrightarrow{\tau'} <: \overrightarrow{\tau} \qquad p; \Delta' \vdash \tau_0 <: [\overrightarrow{\alpha}/\overrightarrow{\alpha'}]\tau'_0 \end{array}}{p \vdash \textit{override}(f, C, [\![\overrightarrow{\alpha \text{ extends } \{\overrightarrow{K}\}}]\!]\ \overrightarrow{\tau} \to \tau_0)}$$

FIG. 6

Evaluation contexts and redexes $$
\begin{aligned}
v &::= O[\vec{\tau}](\vec{v}) \\
E &::= \Box \\
&\quad | \quad O[\vec{\tau}](\vec{v}\,E\,\vec{e}) \\
&\quad | \quad E.x \\
&\quad | \quad E \text{ in } \tau.f[\vec{\tau}](\overrightarrow{e \text{ in } \tau}) \text{ in } \tau \\
&\quad | \quad v \text{ in } \tau.f[\vec{\tau}](\overrightarrow{v \text{ in } \tau}\, E \text{ in } \tau\, \overrightarrow{e \text{ in } \tau}) \text{ in } \tau \\
&\quad | \quad \text{typecase } x = E \text{ in } \overline{\tau \Rightarrow e} \text{ else } e \text{ end} \\
R &::= v.x \\
&\quad | \quad v \text{ in } \tau.f[\vec{\tau}](\overrightarrow{v \text{ in } \tau}) \text{ in } \tau \\
&\quad | \quad \text{typecase } x = v \text{ in } \overline{\tau \Rightarrow e} \text{ else } e \text{ end}
\end{aligned}
$$

Evaluation rules: $\boxed{p \vdash E[R] \longrightarrow E[e]}$

[R-FIELD]
$$\frac{\text{object } O[\overline{\alpha \text{ extends }\_}](\overline{x\!:\!\_})\_ \text{ end} \in p}{p \vdash E[O[\vec{\tau}](\vec{v}).x_i] \longrightarrow E[v_i]}$$

[R-METHOD]
$$\frac{\begin{array}{c}mtype_p(f, C[\vec{\tau^c}], \emptyset) = \{([\overline{\alpha' \text{ extends }\_}]\vec{\tau''} \to \tau'_0, \_)\} \quad S([\vec{\tau'}/\vec{\alpha'}]\vec{\tau''}) = \vec{\tau^d} \quad S([\vec{\tau'}/\vec{\alpha'}]\tau'_0) = \tau^r \\ \text{object } O\_ (\overline{x\!:\!\_})\_ \text{ end} \in p \quad mbody_p(f[\vec{\tau'}], O[\vec{\tau}], C[\vec{\tau^c}]) = \{(\vec{x'}) \to e\}\end{array}}{p \vdash E[O[\vec{\tau}](\vec{v}) \text{ in } C[\vec{\tau^c}].f[\vec{\tau'}](\overrightarrow{v' \text{ in } \tau^d}) \text{ in } \tau^r] \longrightarrow E[[\vec{v}/\vec{x}][O[\vec{\tau}](\vec{v})/\mathtt{self}][\vec{v'}/\vec{x'}]Se]}$$

[R-TYPECASE]
$$\frac{type(v) = \tau^v \quad |\vec{\tau}| = n \quad \neg(p; \emptyset \vdash \tau^v <: \tau_i) \quad 1 \leq i < n \quad p; \emptyset \vdash \tau^v <: \tau_n}{p \vdash E[\text{typecase } x = v \text{ in } \overline{\tau \Rightarrow e}\, \overline{\tau' \Rightarrow e'} \text{ else } e \text{ end}] \longrightarrow E[[v/x]e_n]}$$

[R-TYPECASEELSE]
$$\frac{type(v) = \tau^v \quad \neg(p; \emptyset \vdash \tau^v <: \tau_i) \quad 1 \leq i \leq |\vec{\tau}|}{p \vdash E[\text{typecase } x = v \text{ in } \overline{\tau \Rightarrow e} \text{ else } e' \text{ end}] \longrightarrow E[[v/x]e']}$$

Method body lookup: $\boxed{mbody_p(f[\vec{\tau}], \tau, \tau) = \{(\vec{x}) \to e\}}$

[MB-SELF]
$$\frac{\_C[\overline{\alpha \text{ extends }\_}]\_\overline{fd}\_ \in p \quad f[\overline{\alpha' \text{ extends }\_}](\overline{x'\!:\!\_})\!:\!\_ = e \in \{\overrightarrow{fd}\}}{mbody_p(f[\vec{\tau'}], C[\vec{\tau}], C[\vec{\tau^c}]) = \{(\vec{x'}) \to [\vec{\tau'}/\vec{\alpha'}][\vec{\tau^c}/\vec{\alpha}]e\}}$$

[MB-WITNESS]
$$\frac{\_C[\overline{\alpha \text{ extends }\_}]\_\overline{fd}\_ \in p \quad f[\overline{\alpha' \text{ extends }\_}](\overline{x'\!:\!\_})\!:\!\_ = e \in \{\overrightarrow{fd}\} \\ \tau^o \neq C[\_] \quad witness_p(C[\vec{\tau}], \tau^o) = S}{mbody_p(f[\vec{\tau'}], C[\vec{\tau}], \tau^o) = \{(\vec{x'}) \to [\vec{\tau'}/\vec{\alpha'}](S([\vec{\tau}/\vec{\alpha}]e))\}}$$

[MB-SUPER]
$$\frac{\_C[\overline{\alpha \text{ extends }\_}]\_ \text{ extends } \{\vec{N}\}\_\overline{fd}\_ \in p \quad f \notin \overline{\{Fname(fd)\}} \quad C \neq C'}{mbody_p(f[\vec{\tau'}], C[\vec{\tau}], C'[\vec{\tau^c}]) = \bigcup_{N_i \in \{\vec{N}\}} mbody_p(f[\vec{\tau'}], [\vec{\tau}/\vec{\alpha}]N_i, C'[\vec{\tau^c}])}$$

[MB-STATIC]
$$\frac{\_C[\overline{\alpha \text{ extends }\_}]\_ \text{ extends } \{\vec{N}\}\_\overline{fd}\_ \in p \quad f \notin \overline{\{Fname(fd)\}}}{mbody_p(f[\vec{\tau'}], C[\vec{\tau}], C[\vec{\tau^c}]) = \bigcup_{N_i \in \{\vec{N}\}} mbody_p(f[\vec{\tau'}], [\vec{\tau^c}/\vec{\alpha}]N_i, \mathtt{Object})}$$

[MB-OBJ]
$$mbody_p(f[\vec{\tau}], \mathtt{Object}, \tau) = \emptyset$$

FIG. 7

Types of values: $\boxed{type(v) = \tau}$ $type(O[\vec{\tau}](\vec{v})) = O[\vec{\tau}]$ Finding witnesses from the static type of the receiver: $\boxed{witness_p(\tau, \tau') = S}$ $$witness_p(\tau, \tau') = \begin{cases} [\,] & \text{if } \tau' = \texttt{Object} \\ match(C[\![\vec{\tau}]\!], C[\![\vec{\tau'}]\!]) & \text{if } \tau = C[\![\vec{\tau}]\!] \text{ and } \tau' = C[\![\vec{\tau'}]\!] \\ S_n \cdots S_1 & \text{if } \tau = C[\![\vec{\tau}]\!], \tau' = C'[\![\vec{\tau'}]\!], C \neq C', \_ \; C[\![\overrightarrow{\alpha \text{ extends} \_}]\!]\_ \text{ extends } \{\vec{N}\}\_ \in p, \\ & \text{and } witness_p([\vec{\tau}/\vec{\alpha}]N_i, C'[\![\vec{\tau'}]\!]) = S_i \text{ for } N_i \in \{\vec{N}\} \\ [\,] & \text{otherwise} \end{cases}$$

Match two types to get substitutions: $\boxed{match(\tau, \tau') = S}$ $$match(\tau, \tau') = \begin{cases} [\,] & \text{if } \tau = \tau' \\ [\tau'/\beta] & \text{if } \tau = \beta \\ S_n \cdots S_1 & \text{if } \tau = C[\![\vec{\tau}]\!], \tau' = C[\![\vec{\tau'}]\!], \text{ and } match(S_{i-1} \cdots S_1 \tau_i, \tau_i') = S_i \text{ for } 1 \leq i \leq n \\ [\,] & \text{otherwise} \end{cases}$$

FIG. 8

METHOD AND APPARATUS FOR EXPRESSING AND CHECKING RELATIONSHIPS BETWEEN TYPES

BACKGROUND

1. Field of the Invention

The present invention relates to programming languages for computer systems. More specifically, the present invention relates to a method and an apparatus that facilitate expressing type relationships and using the expressed type relationships to check the type soundness of a program.

2. Related Art

As computer programs grow increasingly more complicated, it is becoming progressively harder to ensure that such programs operate reliably. Software developers typically rely on type-checking mechanisms within compilers or interpreters to reduce the number of runtime errors that occur when a computer program executes. These type-checking mechanisms are typically supported by corresponding type-related programming language features, which allow type relationships to be expressed for various data items and functions within a program.

Some programming languages support "parametric types," which can be expressed using type parameters. Parametric types enable greater precision of type checking and can also reduce code duplication. However, many formulations of parametric types require significant verbosity and place severe limits on expressible type relationships. For example, in programming languages with nominal subtyping, including Eiffel, C#, and the Java™ Programming Language, it is often required to explicitly instantiate more type parameters than is necessary to infer a full type instantiation. It is also difficult to express useful type relationships among instantiations, relationships such as covariance and contravariance, without additional language primitives. Conventional type-inference techniques provide only a partial solution to the former problem, and offer no help with the latter.

Hence, what is needed is a method and an apparatus for expressing and checking type relationships without the above-described problems.

SUMMARY

One embodiment of the present invention provides a system for generating executable code. During operation, the system receives source code, wherein the source code can include declarations for types and operations, wherein the type declarations may be parameterized, and wherein the source code may specify subtyping relationships between declared types. Next, the system compiles or interprets the source code to produce executable code, wherein the type parameters may be instantiated by different types during execution, and wherein the result of executing operations may depend upon the instantiations of the type parameters. While compiling or interpreting the source code, the system checks the types and operations in the source code to ensure that the executable code generated is type-safe, and hence will not generate type errors during execution.

In a variation on this embodiment, the subtyping relationships that can be specified in the source code include variance relationships.

In a variation on this embodiment, a subtyping relationship is specified in the declaration of the subtype.

In a further variation, a type declaration may express a subtyping relationship between the type and other types, where the other types have parameters that are not parameters of the type being declared.

In a variation on this embodiment, a type declaration may introduce one or more hidden type variables that scope over the declaration.

In a further variation, one or more hidden type variables in a type declaration may be used to eliminate redundant type parameters.

In a further variation, one or more hidden type variables may be used to express subtyping relationships.

In a further variation, one or more hidden type variables may be used to define a subtyping relationship between the type being declared and infinitely many other types.

In a further variation, the infinitely many types may include instantiations of the type being declared.

In a variation on this embodiment, the operations that depend on the instantiations of the type parameters may include casting operations.

In a variation on this embodiment, the operations that depend on the instantiations of the type parameters may include "instance of" testing to test whether an object has a type.

BRIEF DESCRIPTION OF THE FIGURES

FIG. 1 illustrates syntax of Core Fortress with Where Clauses (CFWC) in accordance with an embodiment of the present invention.

FIG. 2 illustrates static semantics of CFWC (I) in accordance with an embodiment of the present invention.

FIG. 3 illustrates static semantics of CFWC (II) in accordance with an embodiment of the present invention.

FIG. 4 illustrates static semantics of CFWC (III) in accordance with an embodiment of the present invention.

FIG. 5 illustrates static semantics of CFWC (IV) in accordance with an embodiment of the present invention.

FIG. 6 illustrates static semantics of CFWC (V) in accordance with an embodiment of the present invention.

FIG. 7 illustrates dynamic semantics of CFWC (I) in accordance with an embodiment of the present invention.

FIG. 8 illustrates dynamic semantics of CFWC (II) in accordance with an embodiment of the present invention.

DETAILED DESCRIPTION

Figure 9:
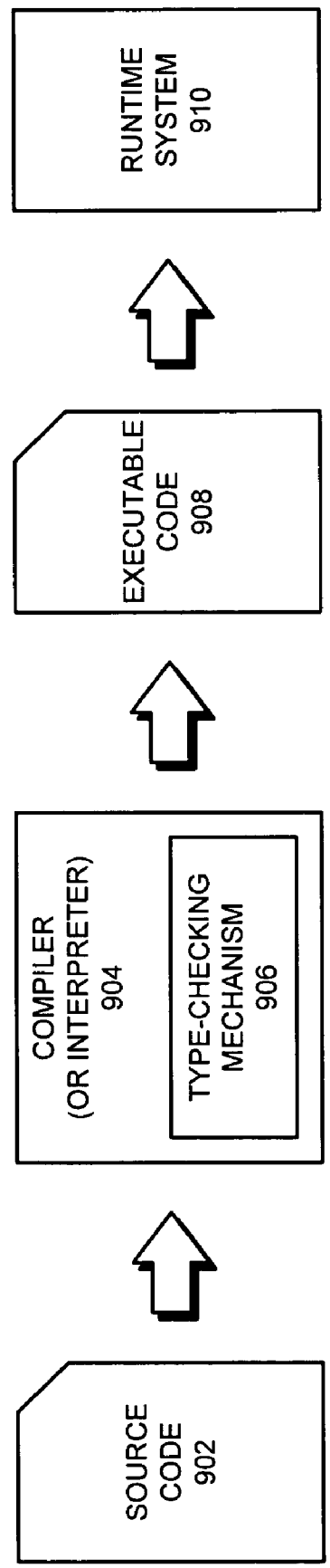
FIG. 9 illustrates a compiler (or interpreter) with a type-checking mechanism in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Overview

We present a mechanism to support hidden type variables, which can be used to quantify types beyond their ordinary type parameters. With hidden type variables, a single type can extend, and inherit methods from, infinitely many instantiations of another type. Moreover, with hidden type variables, we can express type relationships such as covariance and contravariance directly, without ad-hoc language features, and we can eliminate redundant type parameters in type instantiations. Unlike previous languages with similar type systems, our formulation does not have a type-erasure semantics: instantiations of type parameters are first-class types that are retained at run time, and can be used in type-dependent operations. Because these parameters may be instantiated by hidden type variables of the parametric type's subtypes, we must be able to reconstruct hidden type variables at run time. This requirement significantly complicates the semantics, in return for type safety and added expressive power.

We also formalize and prove soundness of our type system. Although our formal analysis is directly applicable to the Fortress programming language (a language being designed to support high-productivity scientific computing), it is also relevant to the inclusion of hidden type variables in any type system with nominal subtyping and support for type-dependent operations. (For more details on the Fortress programming language, please see Eric Allen, David Chase, Victor Luchangco, Jan-Willem Maessen, Sukyoung Ryu, Guy L. Steele Jr., and Sam Tobin-Hochstadt, "The Fortress Language Specification Version 0.866," February 2006.)

Introduction

In statically typed object-oriented languages, and languages with nominal subtyping, a nominal subtyping hierarchy is often used to express variant type relationships. For example, in the Fortress programming language, which incorporates embodiments of the present invention, it is possible to model relationships via object definitions and trait definitions. An object definition defines either a single object or (if it is aparametric object definition) a set of objects with common structure. A trait definition defines a named trait with a set of methods in a multiple-inheritance hierarchy; every object extending a trait inherits all the methods declared in that trait and all of its supertraits. For example, we can represent binary trees in Fortress as follows:

```
trait Tree [α] end
object Leaf [α](val:α) extends Tree[α] end
object Branch [α](val:α, left:Tree[α],right:Tree[α])
         extends Tree[α] end
```

The first line declares a trait Tree that is parametric with respect to the type α, denoting the type of element stored at each node. The second line declares a parametric object Leaf[α] that extends Tree[α] and contains a single field val, of type α. The third line declares a parametric object Branch[α] that also extends Tree[α], and has three fields: val (of type α) and the fields left and right (both of type Tree[α]).

Using nominal subtypes to represent variant types has advantages over a conventional encoding of variant types because we can extend the types in our hierarchy with new subtypes. For example, we can extend trait Tree with a new subtype Stem that contains a single Tree:

```
object Stem[α] (down:Tree[α])extends Tree[α] end
```

However, encoding variant types via nominal subtyping has a significant drawback: it is impossible in conventional programming languages to extend all instantiations of a parametric type with a single subtype. For example, we would like to encode the following ML variant type via nominal subtyping:

$$\alpha \text{ list} = \text{Empty}$$
$$| \text{Cons}(\alpha, \alpha \text{ list})$$

In this declaration, the type list is declared to have a single type parameter α, and two variants: Empty and Cons. Because the variant Empty makes no reference to α, it is not parametric with respect to α; a single value Empty is shared by all instantiations of α list. We might try to represent this relationship via nominal subtyping in Fortress as follows:

```
trait List [α] end
object Empty[α] extends List[α] end
object Cons [α](fst:α, rst:List[α]) extends List[α] end
```

However, this encoding is not true to the original because Empty is parametric with respect to α. In effect, each instantiation of List has a separate Empty list. There is no way to represent the correct relationship in a conventional nominal subtyping hierarchy because, syntactically, subtypes specify their supertypes, and these supertypes must be well-formed in the enclosing type environment. Thus, in order to say that Empty extends List[α], we must bind a as a type parameter of Empty. It is important to note that requiring subtypes to specify their supertypes is an essential property of object-oriented languages; it allows programmers to add new subtypes without having to edit or recompile supertypes. But, as our Empty example demonstrates, it can be useful to quantify type parameters over the supertypes of a type without parameterizing the type itself.

It is easy to see why this is the case if we encode our subtyping relationships in a higher-order predicate calculus over a universe consisting of types as predicates and values as the objects of discourse. Then our Empty object definition would state the following relationship:

$$\forall \alpha. \forall x. \text{Empty}[\alpha](x) \rightarrow \text{List}[\alpha](x)$$

(Note that we use square brackets [ ] to denote higher-order function application, while occurrences of → denote logical implication.)

If we view types as predicates and the type parameter α as a variable ranging over predicates, then Empty is a second-order fluction mapping predicates to predicates (as is List). If the predicate Empty[α] applies to a value x, then the predicate List[α] applies as well. We can "de-Skolemize" this statement so that it contains an existential quantification instead of a function definition:

$$\forall \alpha. \exists E_\alpha. \forall x. E_\alpha(x) \rightarrow \text{List}[\alpha](x)$$

What this shows us is that, conceptually, there are two quantifications occurring for α: one is universal; the other is existential. Because conventional generic type systems do not allow us to separate these two quantifications, we are prevented from declaring many important relationships among types. For example, we cannot state universally quantified relationships where there is no implicit existential quantification, as in the ML model of empty lists, where all instantiations of type List apply to a single empty list, as expressed in predicate logic as follows:

$$\forall \alpha. \text{List}[\alpha](\text{Empty})$$

Another consequence of this historical limitation in nominal subtyping is that we must sometimes string along sequences of easily inferred type parameters just to instantiate bounds on the "ones that matter". For example, suppose that we want to define a trait TreeVisitor that visits all variants of some subtype of a type SyntaxTree (such as Expression). We decide to parameterize TreeVisitor by the subtype of SyntaxTree that it visits:

trait TreeVisitor[αextendsSyntaxTree]extends Object end

Now suppose that SyntaxTree is itself parametric. For example, suppose it is parametric with respect to an annotation type:

trait SyntaxTree[αextends Annotation]end

Now, TreeVisitor must include two type parameters: one corresponding to the type of tree it visits, and one corresponding to the type of annotation on those trees:

trait TreeVisitor[α extends Annotation, β extends SyntaxTree[α]] end

The first type parameter is redundant because its value can be inferred from an instantiation of the second. We would like to devise a trait definition where TreeVisitor is parametric only with respect to the type of SyntaxTree it visits, which would correspond to the following statement:

$$\forall \alpha \sqsubseteq \text{Annotation}. \forall \beta \\ \sqsubseteq \text{SyntaxTree}[\alpha].\text{TreeVisitor}[\beta](x) \rightarrow \text{Object}(x)$$

To express declarations like these, and like the declarations in our List example, we propose to generalize conventional nominal subtyping systems to allow for declaration of generic type variables in a where clause that is separate from ordinary type parameter declarations. As with ordinary type parameters, the type variables in a where clause denote universal quantification. But unlike with ordinary type parameters, there is no accompanying constraint that the parameterized type is a function of these hidden variables (or, equivalently, there is no accompanying existential quantification over a parameterized type in de-Skolemized form). For example, we can write the declaration:

object Empty extends List[α] where {α extends Object} end

We interpret this definition as declaring that a single object Empty has all the methods of every instantiation of List[α]. In our predicate calculus:

$$\forall \alpha. \text{List}[\alpha].(\text{Empty})$$

Using where clauses, we can also write trait definitions without redundant type parameters such as:

trait TreeVisitor[β extends SyntaxTree[α]] where {α extends Annotation} end

These hidden type variables are first-class types in the sense that they can be used in any type context, including a type-dependent operation.

Although the idea of hidden type variables is a simple one, this single enhancement provides surprisingly rich expressive power beyond ordinary nominal subtyping. Indeed, we were drawn to the notion of where clauses in the process of designing Fortress, where we were forced to confront the subtle relationships that exist between mathematical objects (many of which cannot be captured in conventional type systems). Hidden type variables are powerful enough even to express useful type relationships such as covariance and contravariance directly in the language (features that usually require additional ad-hoc primitives). For example, in Fortress, we can write type definitions such as:

trait Covar [α extends β] extends Covar[β] where {β extends Object} end
trait Contra [α extends Object] extends Contra[β] where {β extends α} end However, the additional expressive power that we get from hidden type variables in a nominal system does not come for free: several complications arise from the introduction of these variables, and these complications must be resolved to ensure a sound type system. For example, when checking subtyping relationships among types with hidden type variables, one type may be a subtype of infinitely many other types. Therefore, determining whether one type is a subtype of another requires determining whether there is a path between these types in this infinitely broad hierarchy.

Moreover, as we discuss later, the hidden type variables scope over the entire type definition, not only headers, and therefore, they impact not only subtyping relationships, but also method definition, inheritance, and overriding. For example, a parametric trait can contain methods that refer to the type parameters of the enclosing trait, and a subtype of multiple instantiations of a single trait inherits multiple methods with the same name. Thus, constraints must be placed on type definitions to ensure we can compute with them. For example, the body of our Empty object must not contain a field declaration whose type is dependent on α; otherwise it would contain infinitely many fields all with the same name. Also, if Empty contains a method declaration that refers to α, it contains infinitely many methods (one for each instantiation of α). We must ensure it is possible to distinguish which method is referred to at a call site. We must also ensure valid overriding of infinitely many methods by a single method in a subtype, and be able to determine which of infinitely many inherited methods is referred to in a subtype. These issues significantly complicate a formal treatment of hidden type variables. Additionally, all of these issues interact with support for type-dependent operations. Resolving their interaction with type-dependent operations comprised much of the work in formulating the semantics of hidden type variables in Fortress, and our handling of these interactions are part of what distinguish our formulation from similar type systems, such as Parameterized Mini-Cecil (described in Vasily Litvinov, "Constraint-bounded Polymorphism: An Expressive and Practical Type System for Object-Oriented Languages," *PhD. Thesis*, 2003).

In the following disclosure, we explore these problems and solutions to them, in the context of a core calculus for Fortress. We show through this calculus how a type system can be devised that captures the notion of hidden type variables, and we present a proof of type soundness. Although we present this work in the context of Fortress, the idea of hidden type variables is applicable to other languages with nominal sub-typing, inheritance, overriding, and type-dependent operations, either with single or multiple inheritance (including multiple-interface inheritance). Many of the same problems would arise, along with solutions analogous to those we present.

In the following disclosure, we present a core calculus of Fortress with where clauses and illustrate the key features of this calculus. We then explain the semantics of the calculus by illustrating problems that arise in a type system with where clauses, and how we address them.

Calculus of Fortress

Overview of Fortress

Fortress is a general-purpose programming language designed to gracefully support high-performance computation. Fortress includes support for massive parallelism and annotations of data locality for managing large amounts of shared memory. Fortress includes extensible syntax and syntactic support for mathematical notation, static checking of physical units and dimensions, and a modem component system for linking and deployment of libraries. None of these features are relevant to our discussion of where clauses, and we do not discuss them further. What is relevant is the Fortress object model, which we now describe briefly.

Objects, Traits, and Functions

Fortress supports top-level definitions of traits, objects, and functions. An object consists of field and method definitions. A trait consists of method definitions and declarations of abstract methods. A trait may extend other traits (via multiple inheritance): it inherits the methods visible in the traits it extends. It is permissible for a trait to inherit multiple definitions of a single method (and to provide new definitions itself). All such definitions are overloaded. Method calls to overloaded methods are resolved via multiple dispatch. Every object extends a set of traits; an object inherits every method visible in any of the traits it extends. An object can also override the definition of a method inherited from a trait.

Type Parameters

A trait definition can be parametric with respect to a set of types. An object definition can be parametric with respect to a set of types and values. The type and value parameters of an object definition define a constructor. Each value parameter corresponds to a field of the object initialized by the constructor. Each instantiation of the types and values of a parametric object definition is a call to its constructor; such a call results in a new instance of the parametric object. An object with no parameters is a standalone value; it can be referred to directly in expression contexts.

Both trait definitions and object definitions are allowed to include hidden type variables in where clauses. These hidden type variables scope over the entire body of the definition in which they occur. They have all of the expressive power of the hidden type variables discussed previously, along with the complications.

Fortress with Where Clauses

To elucidate the semantics of where clauses in Fortress, we have devised a small core calculus called Core Fortress with Where Clauses (CFWC). Following the precedent set by prior core calculi such as Featherweight Java (described in Atsushi Igarashi, Benjamin Pierce, and Philip Wadler, "Featherweight Java: A Minimal Core Calculus for Java and G J," *ACM Transactions on Programming Languages and Systems*, 23(3):396-450, May 2001), we have abided by the restriction that all valid CFWC programs are valid Fortress programs. Of course, CFWC captures only a tiny part of the entire Fortress semantics. Our intention is to support those aspects of Fortress that have the most interesting interaction with where clauses.

Syntax

The syntax of CFWC is provided in FIG. 1. The metavariables $\alpha$ and $\beta$ range over type variable names; f ranges over method names; x ranges over field names; T ranges over trait names; O ranges over object names; and C ranges over both trait and object names. For simplicity, we use the following notational conventions:

Abbreviations: We use "_" to denote some parts of the syntax which do not have key roles in a rule. We assume that "_" does not expand across definition boundaries unless the entire definition is included in it. We elide empty square brackets, empty parentheses for objects, curly braces for singleton sets, and empty where clauses.

Bounds on type parameters: A type-parameter declaration that does not include an explicit bound is implicitly bound by type Object. For example, trait Tree[α]extends Object end denotes trait Tree[α extends Object]extends Object end Sequences: $\vec{\tau}$ is a shorthand for a possibly empty sequence $\tau_1, \ldots, \tau_n$. We use $\tau_i$ to mean the ith element of $\vec{\tau}$. Similarly, we abbreviate a sequence of relations:

$\alpha_1$ extends $\{\vec{N}_1\}$... $\alpha_n$ extends $\{\vec{N}_n\}$ to $\alpha$ $\overrightarrow{\text{extends } \{N\}}$; and
$\tau_1 <: M_{11}, \tau_1 <: M_{12}, ..., \tau_1 <: M_{1l}, \tau_2 <: M_{21}, ..., \tau_n <: M_{nm}$ to $\vec{\tau} <: \vec{M}$.

Names: We assume that every type variable, field name, parameter, trait name, and object name is distinct.

Substitutions: Substitutions of x with v and α with τ are denoted as [v/x] and [τ/α], respectively. A sequence of substitutions represents the composition of those substitutions where the right-most substitution is applied first. For example, $S_n, \ldots S_1 \tau$ represents $S_n( \ldots S_2(S_1 \tau) \ldots )$ Syntactically, a program in CFWC consists of a sequence of trait and parametric object definitions followed by a single expression, as shown in the following example program:

trait Tree [α] extends Object end
object Leaf [α](val:α) extends Tree[α] end
object Branch [α] (val:α, left:Tree[α],right:Tree[α])
    extends Tree[α]end
object Data extends Object end
Branch[Data] (Data,
    Branch[Data] (Data,Leaf[Data] (Data),Leaf[Data] (Data)),
    Leaf[Data] (Data))

This example CFWC program defines the Fortress binary tree defined previously. Then the program defines one data object, Data, and it constructs a single nonempty tree. As this example program illustrates, valid type references in CFWC are either instantiations of types defined in the program, or references to the special type Object, which sits at the top of the type hierarchy.

Trait and object definitions can include method definitions. A method body contains a single expression. Valid expressions consist of variable references, references to the special identifier self, constructor calls, field accesses, method applications, and type-dependent operations.

For example, a Tree might include a reflect method that returns a "mirror image" of itself, swapping left and right branches of a nonempty tree (and recursively descending those branches). Calling reflect on a Leaf simply returns the Leaf:

```
trait Tree[α] extends Object
    reflect ( ) : Tree[α] = reflect( )
end
object Branch[α] (val:α, left:Tree[α], right:Tree[α]) extends Tree[α]
    reflect( ):Tree[α]=
        Branch[α] (val, right.reflect( ), left.reflect( ) )
end
object Leaf[α] (val:α) extends Tree[α]
    reflect ( ) : Tree[α]= self
end
```

A trait or object definition in CFWC is allowed to include explicit type parameters along with hidden type variables in where clauses. Using a where clause, for example, we can define an alternative definition of Leaf as a single object that extends infinitely many instantiations of List, as follows:

object Leaf extends Tree[α] where {α extends Object} end

All type variables in a trait or object definition must occur either as a type parameter or as a hidden type variable introduced in a where clause.

Type-dependent operations in CFWC allow types to influence the runtime semantics of valid programs. For example, to provide the effect of a casting operator (equivalent to casts in the Java programming language), the following method cast can be defined in CFWC, via typecase:

```
trait Tree[α] extends Object
    cast[β]( ) =
        typecase x = self in
            β => x
            else => error( )
        end
    end
```

The typecase expression reduces its test expression self, compares the type of the test expression with the types in its clauses from top to bottom. Because the types that instantiate type parameters of a parametric type are retained at run time, CFWC supports type-dependent operations such as casts and instance of checks on type parameters in a type-safe way.

Before discussing the semantics of CFWC programs, it is important to explain one idiosyncrasy of the CFWC syntax. In CFWC, every method invocation is annotated with three kinds of static types: the static types of the receiver, the arguments, and the result. As explained below, these annotations are used during static checking of where clauses, and to allow for appropriate dynamic dispatch of methods in types with where clauses. In Fortress itself, most of these annotations are inferred automatically during type checking, but in rare cases (where there are multiple legal types with observably distinguishable behavior), they must be supplied by the programmer. We require them to be present in all cases in CFWC for the sake of simplicity. For presentation brevity, we omit any of these annotations when they are obvious from context. For clarity, we sometimes put parentheses around the receiver when it has an annotation.

Problems and Solutions

Hidden type variables impact the static semantics of CFWC in several places. In this section, we incrementally describe their impact. We first show the basic static semantics, which should be accessible to readers familiar with core calculi of similar complexity such as Featherweight Java. We then describe the typing rules related to where clauses, along with motivating examples.

Basic Static Semantics

The basic static semantics of CFWC is shown in FIGS. 2, 3, and 4. The metavariable σ ranges over method types $$[\alpha \overrightarrow{\text{ extends } \{N\}}]\vec{\tau} \to \tau;$$

Δ ranges over bound environments, $$\overrightarrow{\alpha <: \{N\}};$$

and Γ ranges over type environments $\vec{x:\tau}$. For simplicity, we use FTV(τ) to collect all free type variables in τ and FTV(e) to collect all free type variables in e.

The typing rules are divided according to which piece of the program is being verified. A program is well typed if its definitions are well formed and its trailing expression is well typed in the empty environments (note that the program itself is used as a global lookup table). Definitions are well formed if their corresponding types are well formed. Expression typing rules make use of a subtyping judgment and a lookup function, $\text{mtype}_p$, to find the type of a method.

In several places in CFWC, it is necessary to find witnesses for hidden type variables. In type well-formedness rules, in order to determine whether an instantiation of a type with hidden type variables is well-formed, it is necessary to prove that valid instantiations of the hidden type variables exist, and, by implication, that the constraints placed on the explicit type parameters are satisfiable. In the typing rules themselves, we use instantiations of hidden type variables to check that method invocations are passed suitable arguments. In both cases and similarly in subtyping rules, the validWitness predicate verifies that a set of types are valid instantiations of the hidden type variables. It is not necessary in the rules to show how these witnesses are found. However, it is critical in designing a type checker for where clauses to have an effective procedure for constructing valid witnesses when they exist. Note that finding these witnesses is necessary for type checking, unlike in systems with existential types, where witnesses are supplied by the programmer when they are needed.

Static Annotations for Disambiguating Method Calls

Ordinary parametric type declarations include constraints on type parameters. However, the constraints must be expressed using only ground types and the explicit parameters of the parametric type. In particular, no additional type variables (other than the explicit parameters) may be used to define the constraints. The where clauses allow additional type variables to be used in the expression of the constraints. For example, suppose we wish to encode physical units and dimensions in a Fortress program. We want values to be measurements in a particular unit, such as 5 meters or 12.4 seconds. We define a type Quantity that contains all dimensional values. Each particular dimension, such as Length or Time, is a subtype of Quantity:

```
trait Quantity end
trait Length extends Quantity end
trait Time   extends Quantity end
```

A unit is then an element of a dimension. To support type checking of units, we want units to also be types, so we encode them as follows:

```
object Meter   extends Unit[Length] end
object Second extends Unit[Time]   end
```

A measurement is a value with a particular unit:

```
object Measurement[U extends Unit[D]] (magnitude: R)
       where {D extends Quantity} end
```

Notice that the dimension D is not an explicit parameter of Measurement, but rather it is bound in the where clause. In a conventional type system, Measurement would be required to take both the unit and the dimension as type parameters. The where clauses allow us to omit the dimension, with the intention that it be derived from the unit parameter, making the resulting program more concise and readable.

The where clauses also allow us to express new subtype relationships: a single type can be a subtype of another type instantiated with hidden type variables, which admits an infinite number of instantiations. For example, in many formulations of physical units and dimensions, a measurement of zero is properly considered an element of every quantity. That is, 0 meters and 0 seconds are the same value, not two distinct values in different dimensions but with the same magnitude. Thus, we could define Zero as follows:

```
object Zero extends Measurement[U]
       where {U extends Unit[D], D extends Quantity} end
```

Recall that these two benefits of where clauses (the ability to eliminate easily inferred type parameters in type instantiations and the ability to express new subtype relationships) are two of the motivating features for where clauses discussed in Section 1. However, these two aspects of where clauses have an interesting interaction: The ability to define a type that extends many different instantiations of a parametric type causes problems when we expect to find the hidden type variables from a particular instantiation.

For example, suppose in our previous definition of the Empty list that Empty inherits infinitely many definitions of a method f, corresponding to the infinitely many instantiations of supertype List[α]. Consider the following method invocation:

Empty.f(Empty)

The instance of f that is called is ambiguous. Note that this ambiguity can affect the observable behavior of a program. For example, a hidden type variable might occur in a type-dependent operation within the body of the invoked method (such as the instantiation of an explicit type parameter, or an annotation on yet another method call). Notice also that the problem does not require the infinite number of supertypes that we get from the use of where clauses: it is a consequence of multiple inheritance (in conjunction with hidden type variables bound in a where clause).

Thus, in places where we need to choose which instantiation of a method has been invoked, we require additional annotations to resolve the ambiguity. In CFWC, the required annotations are provided as type ascriptions on method invocations. Our example above would require the following annotation:

(Empty in List[Z]).f(Empty)

We allow type annotations on the receiver, method arguments, or return type. It may be the case that witnesses cannot be determined solely from an annotation on the receiver of a method call. Similarly, an argument or return type annotation alone may not be sufficient.

We now briefly describe how these annotations are used to find valid witnesses for hidden type variables during method invocation. In rule [T-METHOD] presented in FIG. 2, the static types of the receiver and the arguments are checked to ensure they are subtypes of their corresponding annotations. Then the annotations (rather than the static types) are used in the remaining checks. The type of f is determined from the receiver's type annotation using $mtype_p$. Note that, while traversing the type hierarchy to find the definition of a method, $mtype_p$ does not find witnesses for the hidden type variables; instead, it collects the environments defined in each type definition encountered (mapping hidden type variables to their bounds). However, witnesses for hidden type variables that occur in the type of f must exist for the rule to hold. These witnesses are given in the substitution S that matches f's type to the argument and return type annotations.

Witnesses and Type Parameter Constraints

The previous section explains how witnesses for hidden type variables are found statically using type annotations (most of which can be inferred). However, there are programs in which hidden type variables that are not statically evident appear during dynamic dispatch. For example, given the definitions below, the following method invocation (Empty in Comparable).equals(Empty) is well typed but we cannot find a witness at runtime for β in the body of the method equals (inherited in Empty from Lists[β]). (Definitions of the equals methods rely on standard encodings of Boolean operations via objects and methods; we omit definitions of these operations for brevity.):

```
trait Comparable extends Object
    equals(X:Object):Boolean =
        X = self
end
trait List[α] extends Comparable
    first( ) = first( )
    rest ( ) = rest   ( )
    equals(X:List[α]):Boolean =
        self.first( ).equals(X.first( )).
            and(self.rest( ).equals(X.rest( )))
end
object Cons[α](first: α, rest:List[α]) extends List[α] end
object Empty extends List[β] where {β extends Object}end
(Empty in Comparable).equals(Empty)
```

Conceptually, the problem is that Empty does not include its own overriding definition of equals.

In this section, we describe how to guarantee that the type annotations at a method-invocation site are sufficient to find witnesses for hidden type variables that appear at run time. In CFWC, the validWhere predicate, presented in FIG. 5, guarantees this property.

To understand the validWhere rule, let us assume that we have the method body $e_f$ for a method invocations from a receiver at run time. There are two kinds of hidden type variables in $e_f$: (1) hidden type variables that exist at compile time and (2) hidden type variables that are not evident at compile time but appear at run time. For (1) the hidden type variables in $e_f$ result from traversing the type hierarchy from the static type annotation of the receiver to $e_f$ (via $mtype_p$). For (2), the hidden type variables result from traversing the type hierarchy from the dynamic type of the receiver to the static type annotation of the receiver (via $mbody_p$). We find every witness for (1) at compile time by using the type annotations of the receiver, the arguments, and the result (as described in the previous section). We also need to find witnesses for (2) at run time. But if neither the static type nor the runtime type of the receiver provide witnesses (as is the case with the call to (Empty in Comparable).equals (Empty), witnesses from the runtime type of the receiver will not be available to propagate to the method-definition site, and the problem cannot be predicted at compile time.

We resolve this problem as follows: If a method f is defined in a trait T, and overridden in a parametric subtrait S that provides a signature of f that includes its type parameters, then every type that extends infinitely many instantiations of S using hidden type variables overrides f with a definition that does not refer to hidden type variables. The practical implication of this requirement is that we check all overridden methods by traversing the type hierarchy up to the first trait defining f, that the signatures and return types in each overriding are valid, and that all necessary overridings are included.

In our example with lists, the definition of Empty is rejected by validWhere because it does not override method equals, inherited from infinitely many instantiations of List. Conversely, the following example is allowed:

```
trait Comparable extends Object
    equals(X:Object):Boolean =
        X = self
end
trait List[α] extends Comparable
    first( ) = first( )
    rest( ) = rest ( )
    equals(X:List[α]): Boolean =
        self.first( ).equals(X.first( )).
            and(self.rest( ).equals(X.rest( )))
    cons(x:α):List[α] = Cons[α] (X,self)
end
object Cons[α](first: α, rest:List[α]) extends List[α] end
object Empty extends List[β] where {β extends Object}
    equals(X:Empty):Boolean =
        X = self
end
```

In this example, object Empty overrides equals without mentioning β in the overriding method, thereby ensuring that all calls to equals are unambiguous. On the other hand, Empty can inherit cons.from Lists[β] without overriding, despite the fact that the signature of cons refers to a hidden type variable. This is allowed because method cons is introduced in trait List. Because it is impossible for the static type of a receiver of cons to be a proper supertype of List, we can ensure that a valid witness for the argument of cons is always provided, either by the static type of the receiver, or by an annotation on the receiver.

Notice that this complication comes from the need to reconstruct witnesses for hidden type variables at run time. Due to this ability to find witnesses at run time, CFWC can support type-dependent operations in a type-safe manner.

Covariant Lists with Cons

Hidden type variables allow us to express subtype relationships between various instantiations of a single parametric type. For example, consider the following definition of simple numeric types, and of a trait List:

```
trait Number end
trait Z extends Number end
trait R extends Number end
trait List[α extends β] extends List[β]
    where {β extends Object}
        cons(X:β) :List[β] = Cons[β](X,self)
end
```

The definition of trait List[α] expresses that an instantiation List[α] is a subtype of every instantiation List [β] such that a is a subtype of β, i.e., it expresses the fact that lists are covariant. Traditionally, covariant types such as this have been inexpressible without the introduction of ad-hoc constructs to a language, such as variance types or wildcards. But this definition goes beyond just what is expressible with ad-hoc annotations; it actually gives us a handle on the instantiation of the type parameter of a supertype (in this case, the type parameter β). This handle is a powerful tool; we can use it to declare method signatures that are otherwise inexpressible.

For example, consider the following method invocation:

Cons[Z](3, Empty).cons[R](5.7)

At first glance this expression may appear ill-typed. How can a floating-point number be added to a list of integers? But note that the parameter type of method cons is not α; it is β. In effect, cons can be called on a List [α] with any value of a type β that is a supertype of α; the result of the operation is a Lists[β]. The value 5.7 is of type R, but it is also of type Number, which is a supertype of Z. Because List[Z] inherits the cons method from List[Number], this invocation is well typed with the result:

Cons[Number](5.7, Cons[Z](3, Empty))

Most object-oriented languages with variance types use variance annotations for access restrictions: covariant types are used as read-only and contravariant types are used as write-only to preserve type soundness. For example, among a possible set of methods in invariant lists, contravariant lists cannot provide methods such and first and rest and neither covariant nor contravariant lists can provide cons and append methods. These restrictions are necessary because traditionally a variance type definition does not have a handle on the instantiation of a supertype.

Self extensions such as covariant lists raise another potential stumbling block. How do we know that each method definition is a valid overriding of itself? This issue is complicated by the fact that hidden type variables can occur in method types. However, it turns out that overriding in the presence of hidden type variables can be handled in the standard way. The overriding rule, override(f, C, σ) as shown in FIG. 6 considers f to be a valid overriding of any visible method f in any of C's supertraits whose type is a supertype of σ. Effectively, we support contravariant overriding on parameter types and covariant overriding on result types.

Cyclic Hierarchy Problems

By allowing trait definitions to extend other instantiations of themselves, we are able to use where clauses to express type relationships that usually have required ad-hoc language features, such as covariance and contravariance. However, allowing a trait to extend other instantiations of itself raises the possibility of a cyclic type hierarchy. Consider:

---
trait T[α extends Object] extends T[β]
where {β extends Object} end
---

Then we have

T[T[Object]]<: T[Object]<: T[T[Object]].

We could simply restrict cyclic hierarchies by fiat, but such a restriction is not useful unless there is an effective algorithm for enforcing it. Therefore, we place a set of computable restrictions on trait definitions to prevent cycles in the following manner. Suppose we have the following trait definition in a program p:

$$\text{trait } T[\overrightarrow{\alpha \text{ extends } \{K\}}] \text{ extends } \{\overrightarrow{N}\} \text{ where } \{\overrightarrow{\beta \text{ extends } \{H\}}\} \text{ end}$$

We say that T directly depends on S≠T in p if $N_i = S[\overrightarrow{\tau}]$ for some i and $\overrightarrow{\tau}$, and that T depends on S in p if T directly depends on S or if T depends on some R that directly depends on S; the depends relation is the transitive closure of the directly-depends relation. Note that T never directly depends on itself. We say that T is self-extending in p if $N_i = T[\overrightarrow{\tau}]$ for some i and $\overrightarrow{\tau}$; we say that $N_i$ is a self-supertype of T. We often omit mentioning the program p when it is obvious from context.

We impose the following three restrictions on the trait definition:
(R1) T must not depend on itself (i.e., there are no cycles except through self-extension).
(R2) T has at most one self-supertype.
(R3) If T is self-extending with self-supertype $T[\overrightarrow{\tau}]$, then for each type parameter $\alpha_i$, one of the following holds:
   (a) $\tau_i = \alpha_i$;
   (b) $\tau_i = K_{ij}$ for some j;
   (c) $\tau_i = \beta_j$ and $\alpha_i = H_{jk}$ for some j and k; or
   (d) $\tau_i = \alpha_j$ and $\alpha_i = K_{jk}$ for some j≠i and k.

Informally, the third restriction (R3) says that each type parameter of T either bounds or is bound by the corresponding type argument in the self-supertype. It should be clear that these restrictions permit traits to have invariant, covariant and contravariant type parameters (each corresponding to one case of the third restriction above--the fourth case is similar to the one for contravariance, but using an ordinary type parameter, rather than a hidden one, as the type argument).

Dynamic Semantics

The dynamic semantics for CFWC is provided in FIGS. 7 and 8. The only normal forms (a.k.a., values) of CFWC are object instances whose arguments have been fully evaluated. Each non-value expression is evaluated by decomposing it into an evaluation context E (an expression that contains a hole □ as a subexpression) and a redex R. The redex is reduced according to the rules [R-FIELD], [R-METHOD], [R-TYPECASE], and [R-TYPECASEELSE]. The definition of evaluation contexts imposes a leftmost, innermost evaluation strategy.

The [R-FIELD] rule replaces a field access by the corresponding value argument of the object instance (recall that the value arguments of an object initialize the fields of that object). The [R-METHOD] rule replaces a method invocation with the body of the invoked method, where object value arguments and method arguments are substituted for their respective parameters. However, this rule is further complicated by the fact that witnesses must be found for hidden type variables occurring in the body of the invoked method (as described in the following section). The [R-TYPECASE] rule compares the type of the test value with the types in the $$\overrightarrow{\tau \Rightarrow \_}$$

clauses from top to bottom. The first match is chosen and the typecase expression is replaced by the corresponding expression where the test value is substituted for the bound variable. If no applicable clause is found, the [R-TYPECASEELSE] rule replaces the type case expression with the corresponding expression of the else clause.

Finding Witnesses

Intuitively, there are two kinds of hidden type variables that we must find witnesses for: those that are present in the static type of the invoked method and those that only appear in the type of the invoked method after we have reduced the receiver to its dynamic form. The [T-METHOD] and [VALID-WHERE] rules, guarantee that we can find witnesses for both kinds of hidden type variables. In this section, we show how we find the witnesses.

Witnesses for hidden type variables are found at run time by the $\text{mbody}_p$ function. Witnesses for hidden type variables that are present in the static type of the invoked method are found in the same way as was done in the static semantics (as described for [T-METHOD] above), that is, by unifying the static type of the method with the argument and return type annotations given at the invocation site.

The remaining witnesses are found by traversing the type hierarchy upward from the dynamic type of the receiver. Let us say that a trait or object is an owner of a method f if it defines f. If the owner of f is a supertype of the static type of the receiver then, when traversing the type hierarchy, we must pass through the static type of the receiver. At this point, the receiver annotation is used to find witnesses as described in [MB-STATIC]. Otherwise, the owner is a subtype of the static type of the receiver. Recall that the validWhere rule requires all hidden type variables appearing in the signature or return type of a called method to be inferrable from the dynamic type of the receiver (either through propagation of type variables and annotations from the dynamic type to the owner of the method, or through overriding). Because there is an owner of the method that is a supertype of the static receiver (otherwise the invocation would not be well typed), the hidden type variables are guaranteed to reach the static type of the receiver. The $\text{witness}_p$ function continues the type hierarchy traversal from the point where $\text{mbody}_p$ leaves off as described in [MB-WITNESS], and continues until the static type of the receiver is reached. Again, the receiver annotation is used to find witnesses.

In short, witnesses for hidden type variables that are not present statically are found by traversing the type hierarchy to the static type of the receiver and matching the resulting type against the receiver annotation. By reconstructing witnesses for hidden type variables in this way, CFWC provides type-dependent operations in a type-safe manner.

Type Soundness

CFWC enjoys type soundness: If an expression is well typed then it reduces to another well typed expression (in fact the type of the reduced expression is a subtype of the original expression). In the following we write p is well typed if there exists τ such that ⊢ p:τ and we write p⊢e→*v if there exists 0 or more evaluation rules to apply from e to v.

Theorem 1 (Progress). If p; ∅; ∅⊢e:τ then either e is a value or p⊢e→e' for some e'.

Theorem 2 (Subject Reduction). If p is well typed and p; ∅; ∅⊢e:τ and p⊢e→e' then p; ∅; ∅⊢e':τ' for some τ' such that p; ∅⊢τ'<:τ.

Theorem 3 (Type Soundness). If p; ∅; ∅⊢e:τ and p⊢e→*v, then p; ∅; ∅⊢v:τ' for some τ' and p; ∅⊢τ'<:τ.

Compiler or Interpreter

FIG. 9 illustrates a compiler (or interpreter) with a type-checking mechanism in accordance with an embodiment of the present invention. The system starts with a source code file 902. Source code file 902 feeds through a compiler (or an interpreter) 904, which includes type-checking mechanism 906 to produce executable code 908, which can subsequently be executed on runtime system 910.

Figure 10:
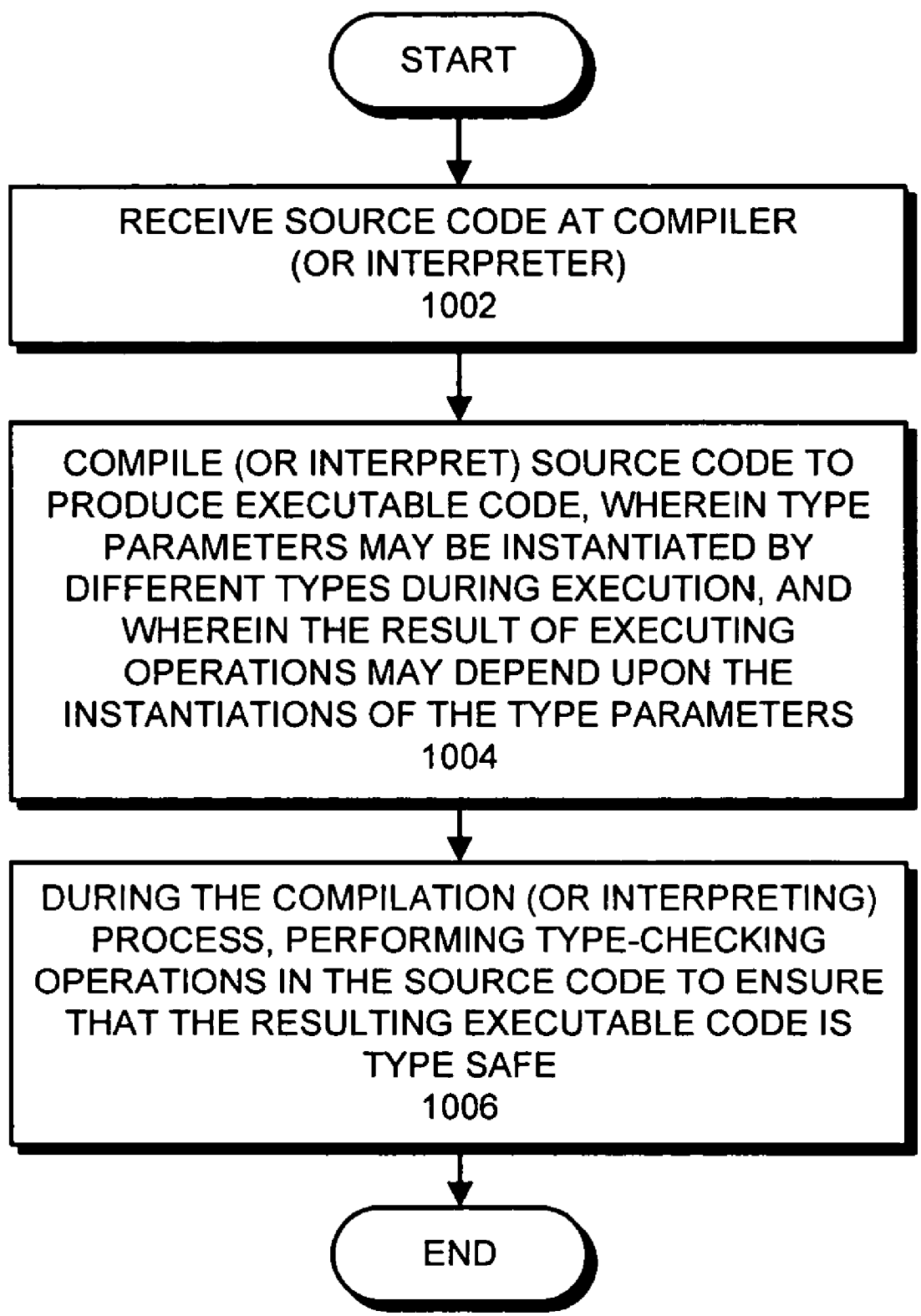
FIG. 10 presents a flow chart illustrating the compilation process in accordance with an embodiment of the present invention.

While converting the source code 902 into executable code 908, the present invention goes through the following process illustrated in FIG. 10. First, the system receives the source code 902 at the compiler (or interpreter) 904 (step 1002). Next, the system compiles (or interprets) the source code to produce executable code, wherein the type parameters may be instantiated by different types during execution, and wherein the result of executing operations may depend upon the instantiations of the type parameters (step 1004). During this compilation (or interpreting) process, the system performs type-checking operations in the source code to ensure that the executable code generated is type-safe, and hence will not generate type errors during execution (step 1006).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for generating executable code, comprising:
   receiving source code which has not been compiled into executable code, wherein the source code can include declarations for types and operations, wherein the type declarations may be parameterized, and wherein the source code may specify subtyping relationships between declared types; and
   compiling or interpreting the source code to produce executable code to be executed during runtime, wherein compiling or interpreting source code comprises including hidden type variables as type parameters that express type relationships directly and not adhering to type erasure semantics, wherein the type parameters are retained at runtime and are instantiated by different types during execution, and wherein the result of executing operations may depend upon the instantiations of the type parameters;
   wherein compiling or interpreting source code involves, checking prior to runtime the types and operations in the source code to ensure that the executable code generated is type-safe, and hence will not generate type errors during execution.

2. The method of claim 1, wherein the subtyping relationships that can be specified in the source code include variance relationships.

3. The method of claim 1, wherein a subtyping relationship is specified in the declaration of the subtype.

4. The method of claim 3, wherein a type declaration may express a subtyping relationship between the type and other types, where the other types have parameters that are not parameters of the type being declared.

5. The method of claim 1, wherein a type declaration may introduce one or more hidden type variables that scope over the declaration.

6. The method of claim 5, wherein one or more hidden type variables in a type declaration may be used to eliminate redundant type parameters.

7. The method of claim 5, wherein one or more hidden type variables may be used to express subtyping relationships.

8. The method of claim 5, wherein one or more hidden type variables may be used to define a subtyping relationship between the type being declared and infinitely many other types.

9. The method of claim 8, wherein the infinitely many types may include instantiations of the type being declared.

10. The method of claim 1, wherein the operations that depend on the instantiations of the type parameters may include casting operations.

11. The method of claim 1, wherein the operations that depend on the instantiations of the type parameters may include "instance of" testing to test whether an object has a type.

12. A computer-readable storage medium storing instructions that when executed by a computer cause the computer to perform a method for generating executable code, the method comprising:
   receiving source code which has not been compiled into executable code, wherein the source code can include declarations for types and operations, wherein the type declarations may be parameterized, and wherein the source code may specify subtyping relationships between declared types; and
   compiling or interpreting the source code to produce executable code to be executed during runtime, wherein compiling or interpreting source code comprises including hidden type variables as type parameters that express type relationships directly and not adhering to type erasure semantics, wherein the type parameters are retained at runtime and are instantiated by different types during execution, and wherein the result of executing operations may depend upon the instantiations of the type parameters;
   wherein compiling or interpreting source code involves, checking prior to runtime the types and operations in the source code to ensure that the executable code generated is type-safe, and hence will not generate type errors during execution.

13. The computer-readable storage medium of claim 12, wherein the subtyping relationships that can be specified in the source code include variance relationships.

14. The computer-readable storage medium of claim 12, wherein a subtyping relationship is specified in the declaration of the subtype.

15. The computer-readable storage medium of claim 14, wherein a type declaration may express a subtyping relationship between the type and other types, where the other types have parameters that are not parameters of the type being declared.

16. The computer-readable storage medium of claim 12, wherein a type declaration may introduce one or more hidden type variables that scope over the declaration.

17. The computer-readable storage medium of claim 16, wherein one or more hidden type variables in a type declaration may be used to eliminate redundant type parameters.

18. The computer-readable storage medium of claim 16, wherein one or more hidden type variables may be used to express subtyping relationships.

19. The computer-readable storage medium of claim 16, wherein one or more hidden type variables may be used to define a subtyping relationship between the type being declared and infinitely many other types.

20. The computer-readable storage medium of claim 19, wherein the infinitely many types may include instantiations of the type being declared.

21. The computer-readable storage medium of claim 12, wherein the operations that depend on the instantiations of the type parameters may include casting operations.

22. The computer-readable storage medium of claim 12, wherein the operations that depend on the instantiations of the type parameters may include "instance of" testing to test whether an object has a type.

23. An apparatus that compiles or interprets source code to produce executable code, comprising:
   a processor;
   memory coupled to the processor;
   a receiving mechanism configured to receive the source code which has not been compiled into executable code, wherein the source code can include declarations for types and operations, wherein the type declarations may be parameterized, and wherein the source code may specify subtyping relationships between declared types; and
   a processing mechanism configured to compile or interpret the source code to produce executable code to be executed during runtime, wherein compiling or interpreting source code comprises including hidden type variables as type parameters that express type relationships directly and not adhering to type erasure semantics, wherein the type parameters are retained at runtime and are instantiated by different types during execution, and wherein the result of executing operations may depend upon the instantiations of the type parameters;
   wherein while compiling or interpreting the source code, the processing mechanism is configured to check prior to runtime the types and operations in the source code to ensure that the executable code generated is type-safe, and hence will not generate type errors during execution.

* * * * *